US012682726B2

(12) United States Patent
Volfson

(10) Patent No.: US 12,682,726 B2
(45) Date of Patent: Jul. 14, 2026

(54) PASSIVE PERSONAL LASER DETECTOR WARNING SAFETY DEVICE

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 3 days.

(21) Appl. No.: 18/414,736

(22) Filed: Jan. 17, 2024

(65) Prior Publication Data

US 2024/0242579 A1     Jul. 18, 2024

Related U.S. Application Data

(60) Provisional application No. 63/439,298, filed on Jan. 17, 2023.

(51) Int. Cl.
*G08B 5/36* (2006.01)
*G01S 7/48* (2006.01)
*G08B 21/02* (2006.01)

(52) U.S. Cl.
CPC .............. *G08B 5/36* (2013.01); *G01S 7/4804* (2013.01); *G08B 21/02* (2013.01)

(58) Field of Classification Search
CPC .......... G08B 5/36; G08B 21/02; G01S 7/4804
See application file for complete search history.

(56) References Cited

U.S. PATENT DOCUMENTS

| | | | | |
|---|---|---|---|---|
| 4,625,108 A | * | 11/1986 | Nestel ..................... | G01S 3/784 |
| | | | | 356/141.5 |
| 5,604,695 A | * | 2/1997 | Cantin .................. | G01S 3/7835 |
| | | | | 356/141.5 |
| 5,771,092 A | * | 6/1998 | Dubois ................... | G01S 3/784 |
| | | | | 356/138 |
| 2013/0203464 A1 | * | 8/2013 | Thiruppathi ...... | H04M 1/72409 |
| | | | | 455/557 |

FOREIGN PATENT DOCUMENTS

| | | | | |
|---|---|---|---|---|
| DE | 19851010 B4 | * | 10/2010 | ............. G01S 3/783 |
| IT | 202100005999 A1 | * | 9/2022 | ........... G08B 21/043 |
| WO | WO-2011058191 A1 | * | 5/2011 | ........... G01S 3/7835 |
| WO | WO-2014056543 A1 | * | 4/2014 | ............. A61F 9/022 |
| WO | WO-2014057136 A2 | * | 4/2014 | ............. G01J 1/0266 |
| WO | WO-2018028759 A1 | * | 2/2018 | ............. A61F 9/022 |

* cited by examiner

*Primary Examiner* — Andrew W Bee
(74) *Attorney, Agent, or Firm* — Fish & Richardson P.C.

(57) ABSTRACT

In some implementations, a passive personal laser detector warning safety device includes a plurality of wide frequency range detectors which detect illumination by a high-intensity electromagnetic radiation source. A detector processor is interoperably coupled to the plurality of wide frequency range detectors, where the detector processor continuously monitors a background signal of ambient electromagnetic radiation illumination, where the detector processor compares incoming signals that exceed the background signal, and where the detector processor generates an illumination alert with respect to determined non-spurious signals that exceed the background signal. A plurality of light emitting diodes (LEDs) illuminate to indicate detection of and direction of the high-intensity electromagnetic radiation source. A speaker can emit tone or voice output. Haptics can provide haptic sensory feedback.

7 Claims, 7 Drawing Sheets

PASSIVE PERSONAL LASER DETECTOR WARNING SAFETY DEVICE

CROSS-REFERENCE TO RELATED APPLICATION

This application claims the benefit of priority to U.S. Application No. 63/439,298, filed on Jan. 17, 2023, the contents of which is hereby incorporated by reference.

BACKGROUND

Light amplification by stimulated emission of radiation (laser) and other coherent/collimated, high-intensity electromagnetic radiation (or "light") sources can be damaging to human eyes or be used for purposes that can cause harm to a user, such as detection and targeting of a gunshot. While some of these high-intensity light sources are within the visible light range, other sources can be non-visible and can present a greater danger, as users do not have a visual cue in order to avoid the light source if illuminated. Both visible and non-visible high-intensity light sources can cause eye damage quickly and, in some cases, without knowledge that it is occurring.

SUMMARY

The present disclosure describes a passive personal laser detector warning safety device.

In an implementation, a passive personal laser detector warning safety device includes a plurality of wide frequency range detectors which detect illumination by a high-intensity electromagnetic radiation (or "light") source. A detector processor is interoperably coupled to the plurality of wide frequency range detectors, where the detector processor continuously monitors a background signal of ambient electromagnetic radiation illumination, where the detector processor compares incoming signals that exceed the background signal, and where the detector processor generates an illumination alert with respect to determined non-spurious signals that exceed the background signal. A plurality of light emitting diodes (LEDs) illuminate to indicate detection of and direction of the high-intensity electromagnetic radiation source. A speaker can emit tone or voice output. Haptics can provide haptic sensory feedback.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described safety device can notify a user of an illumination event by a visible or non-visible high-intensity light source to allow the user to take immediate avoidance actions (such as, among other things, eye damage, detection, or a gunshot). Second, the safety device helps to mitigate irresponsible usage of high-intensity light sources. Third, the safety device can enable proactive avoidance of existing high-intensity light sources that may exist in an area. Fourth, the safety device can be used to provide notice to other users in an immediate area of the presence of a high-intensity light source and that another individual has already been illuminated. This permits other users to also take avoidance actions and/or actions to determine the location of the high-intensity light source.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
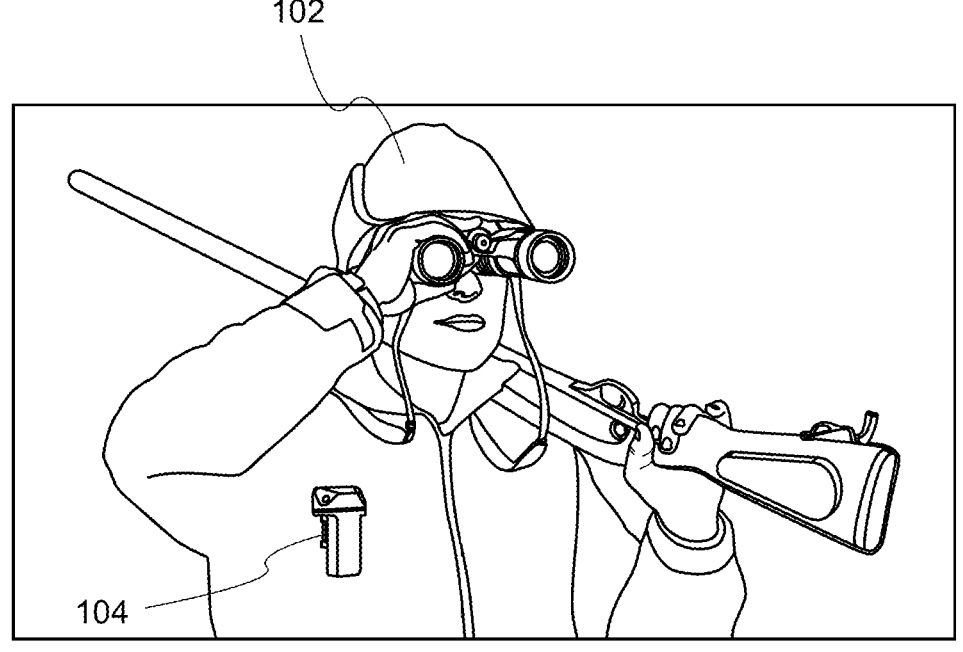
FIG. 1 is an image of an example hunter wearing a passive personal laser detector warning safety device, according to an implementation of the present disclosure.

The following detailed description describes a passive personal laser detector warning safety device (or "safety device"), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Laser and other coherent/collimated, high-intensity electromagnetic radiation (or "light") sources can be damaging to human eyes or be used for purposes that can cause harm to a user, such as detection and targeting of a gunshot. Common high-intensity light sources include handheld laser rangefinders used for golfing/hunting, handheld and weapon-mounted night-vision illuminators (such as, infrared (IR)) and laser pointers, laser traffic speed guns, a variety of commercial lasers, and hand-held, high-intensity spot lights. While some of these high-intensity light sources are within the visible light range, other sources can be non-visible and can present a greater danger, as users do not have a visual cue in order to avoid the light source if illuminated. Both visible and non-visible high-intensity light sources can cause eye damage quickly and, in some cases, without knowledge that it is occurring.

The described safety device is configured to be body-mounted and can be used to notify a user of illumination events by a visible or non-visible high-intensity light source to allow the user/other users to take immediate avoidance actions and/or actions to determine the location of the high-intensity light source. For example, a hunter or law-enforcement officer may receive an illumination alert and immediately seek cover/concealment to avoid a possible gunshot. In some cases, the safety device can also help to mitigate irresponsible usage of high-intensity light sources or to enable proactive avoidance of existing high-intensity light sources that may exist in an area. For example, a number of hunters may be using non-visible IR night vision illuminators, and a hunter can decide to move to a different area to mitigate the possibility of eye damage.

The described safety device can be used to provide course location directions to aid in mitigation of possible negative effects of a detected illumination event by a high-intensity light source. The safety device can also alert a user of an illumination event through selectable audible, visual, and/or tactile feedback.

FIG. 1 is an image 100 of an example hunter wearing a passive personal laser detector warning safety device, according to an implementation of the present disclosure. The hunter 102 has positioned the safety device 104 on the right side of their chest. In some implementations, the safety device can be mounted to the body using Modular Lightweight Load-carrying Equipment (MOLLE) strap/strip on a Pouch Attachment Ladder System (PALS) webbing equipment. Additional mounting methods, such as a VELCRO strap, ¼-20 tripod mount, wire, and rope/twine, adhesives, or others as apparent to those of ordinary skill in the art are also envisioned. The safety device is considered to be passive in that it is configured to receive/process light using one or more wide frequency range detectors.

In some implementations, more than one safety device 102 can be worn to provide greater coverage. For example, hunter 102 could wear a safety device 104 on their chest (as illustrated, and one on a backpack (not illustrated) to provide illumination detection on both front and rear of their body. Likewise, a safety device could also be worn on each side of the body (for example, on a belt) to provide side coverage. As another example, five safety devices 104 could be attached to a vehicle (for example, on the roof and four corners) to provide detection capability for the vehicle and occupants inside.

It should be noted that various implementations of the safety device 104 can be designed depending upon intended use. For example, a commercially available version of the safety device 104 can contain basic detection/alert functionality and operate with non-encrypted communication methods, while a military version may be configured with enhanced light frequency detection capability, faster operation, and encrypted communications.

Figure 2B:
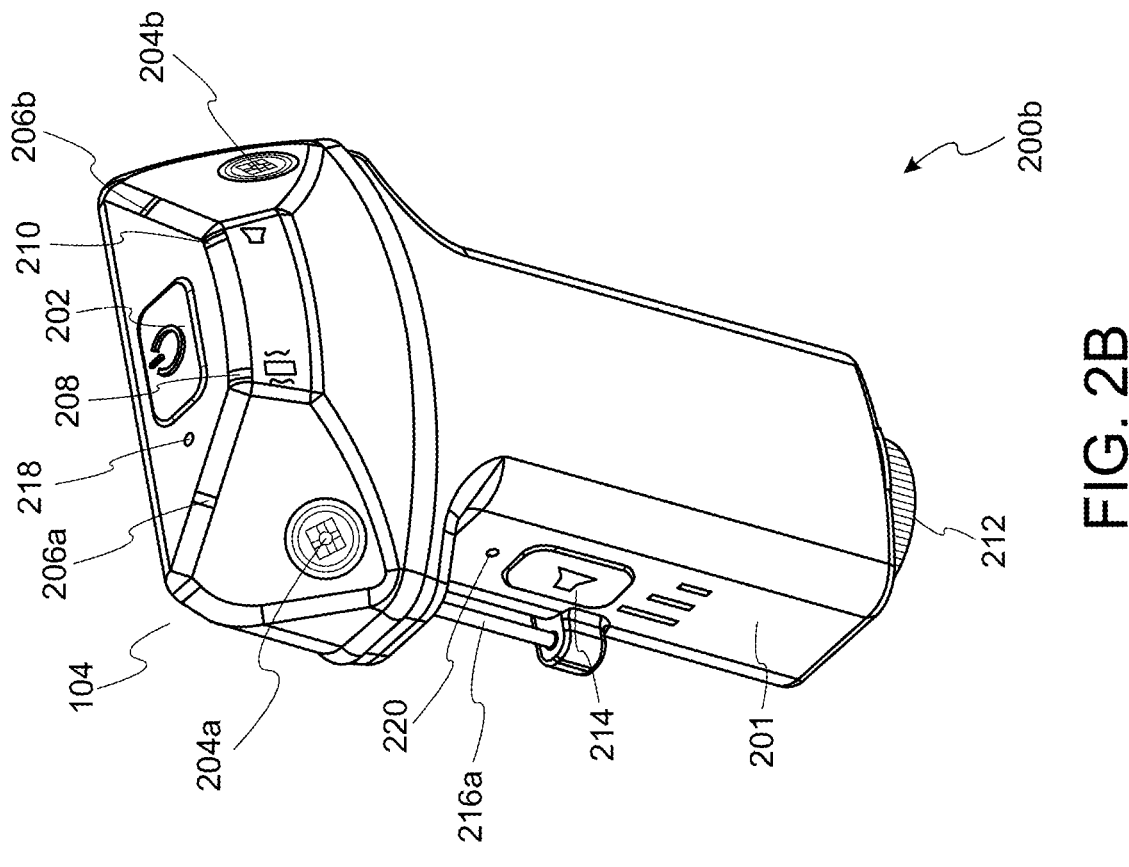
FIG. 2B is a top perspective view of the passive personal laser detector warning safety device, according to an implementation of the present disclosure.
Figure 2A:
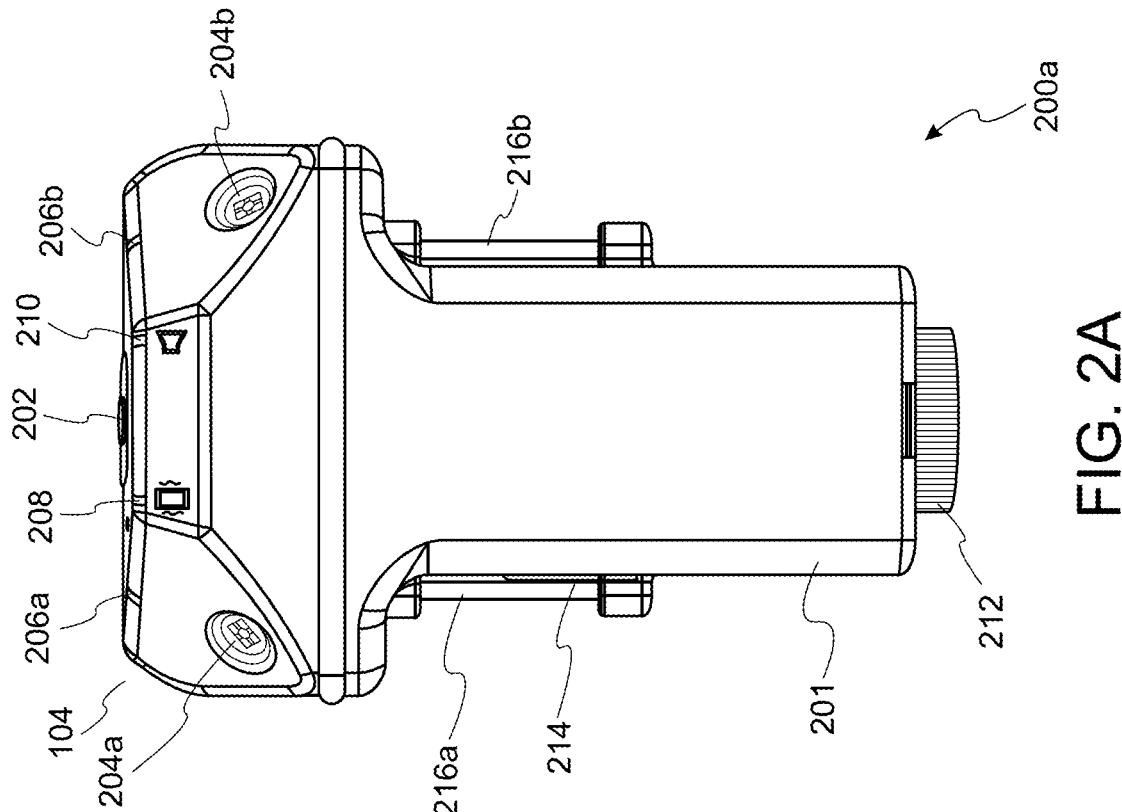
FIG. 2A is a front view of the passive personal laser detector warning safety device, according to an implementation of the present disclosure.

FIG. 2A is a front view 200a of the passive personal laser detector warning safety device 104, according to an implementation of the present disclosure. As illustrated, the safety device includes a case 201, power switch 202, right detector 204a, left detector 204b, right detector light emitting diode (LED) 206a, left detector LED 206b, haptic mode LED 208, auditory mode LED 210, battery cover 212, speaker switch 214, right mounting rod 216a, and left mounting rod 216b.

Case 201 includes and contains all components of the safety device 104. In some implementations, the case includes multiple pieces that are joined together using clips, screws, clamps, adhesive or other methods consistent with this disclosure. In some implementations, the case can be configured to provide various levels of waterproofing or dust proofing, for example the Ingress Protection Standard (IP) IP67.

Power switch 202 is used to power the safety device 104 ON/OFF. A power switch LED 218 (refer to FIG. 2B) indicates whether power to the safety device 104 is either ON/OFF. In some implementations, a low battery level can trigger the safety device 104 to flash the power switch LED 218 to indicate low-battery level.

In some implementations, when the safety device 104 is powered ON by depressing the power switch 202, the safety device 104 enters an operational mode for a set period of time (for example, 10-12 seconds) in which an auditory or haptic operational mode can be selected. For example, in this mode, the default operational mode could be auditory (that is, tone or spoken voice) and be indicated by a steady or flashing auditory mode LED 210, but a secondary depression of the power switch 202 could switch the operation mode to haptic (that is, vibration only) with a steady or flashing haptic mode LED 208. Once the mode is selected, the haptic mode LED 208 or the auditory mode LED 210 can turn off. In some implementations, a further momentary press of the power switch 202 can either set the current operational mode for use or re-enable the operational mode for selection. In some implementations, a longer press of the power switch 202 can turn the safety device 104 OFF.

In typical implementations, the right detector 204a and the left detector 204b (or "detectors") are wide frequency range detectors configured to detect high-intensity light on either end of the electromagnetic spectrum (for example, all visible laser pointer colors (such as, red, green, and blue) and invisible light frequencies (such as, ultraviolet (UV), near IR (NIR), short-wave IR (SWIR), long-wave IR (LWIR), or far IR (FIR))) according to their frequency range detection capability. In some implementations, frequency range detection can include light from 500 nm to 1700 nm. In some implementations, the detection range of the detectors can be at least 500 m. In some implementations, the right detector 204a and the left detector 204b can be individually configured to detect different frequencies/frequency ranges of light.

In some implementations, the detectors are each covered with a protective detector window (for example, plastic, glass, or other material transparent to desired frequencies of light and/or opaque to non-desired frequencies of light). In some implementations, the detector window can be non-reflective. In some implementations, each detector window can include one or more detectors, each detector sensitive to one or more frequencies of light.

The safety device 104 amplifies and manages signals received from the detectors, processes the received signals from each of the detectors, and generates an appropriate alert when appropriate light frequency, intensity, density, and/or duration is detected according to configured values. More specifically, the safety device 104 continuously measures a background signal of ambient light. If another signal comes in that exceeds the background (for example, a high-intensity light source such as a laser) and is determined not spurious (for example, a flashlight or car headlight), then the other signal is considered additional illumination and measured. The "measure" provides an estimation of what is "hitting" the detector(s). In case of high-intensity or laser illumination, an illumination alert is generated, as the additional illumination might be dangerous to the user.

The detectors are used to detect a light signal over and above ambient light (for example, background sunlight or incandescent/fluorescent/LED lighting). When a light signal exceeds a threshold value for ambient light, an illumination event is detected. A laser is a high-intensity/collimated beam of electromagnetic radiation. Even if the laser has a very short duration, the overall brightness of the laser can trigger detection of an illumination event. As an example, a typical night vision illuminator can produce a 75 W pulsed beam of focused/coherent IR light with a high spatial power density/brightness compared to ambient light. The difference in spatial power density/brightness of the night vision illuminator with respect to ambient light is easy to distinguish.

The detectors are placed on the right and left side of the upper part of the case 201 (for example, on the angled portions) to maximize as much vertical/horizontal angular coverage as possible. In some implementations, the safety device 104 can include less or more than two detectors as illustrated, which will affect the total detectable elevation, azimuth, or both.

In some implementations, multiple safety devices 104 can also be linked together (for example, soft linked using Bluetooth or Wi-Fi network link or hard linked using USB cables) to permit greater spatial detection capability. In some implementations, one or more of the safety devices 104 can be configured with similar or different detection capabilities depending on detection needs.

As an example, a single person can wear two different safety devices 104 on their chest to detect two different frequency ranges of light. As another example, two or more people can each wear a single safety device 104 that is linked using Wi-Fi. If one user's safety device 104 generates an alert due to an illumination event, the other safety devices 104 can also generate alerts based on the illumination event and alert their respective users. In some implementations, the other users' alerts can be different than the illuminated user's alert to help distinguish the source of the illumination event.

The detector processor can also determine a course/general detection based upon light signal values determined from processing both detectors. For example, if only the left detector triggered alert due to an illumination event, a general left direction could be indicated to a user (for example, hunter 102) by sounding an auditory alert using a speaker (not illustrated) and illuminating the left detector LED 206a. If both detectors trigger an alert due to an illumination event, then the general detection angle is an angle that is defined by an overlap of detectors (that is, more toward the front of the user), and the safety device can sound an auditory alert using the speaker and illuminating both the right detector LED 206a and the left detector LED 206b. In some implementations, the safety device 104 can illuminate the right detector LED 206a and the left detector LED 206b with varying intensity to better indicate a general level of detection intensity consistent with the illumination events processed by the detector processor.

As can be appreciated, in a multiple user scenario, multiple safety devices 104 can be configured to work in unison to analyze illumination events and to indicate to each respective user a course/general direction of an illumination event in a manner consistent with this disclosure. For example, four soldiers could stand back-to-back and each wear one safety device 104. In this configuration, a 360 degree azimuth and 120 degree elevation relative to the safety devices 104 could be covered for illumination events.

In some implementations, one or more safety devices 104 can be attached to stationary objects (for example, fence posts or trees) to provide illumination event detection. As example could be a safety device attached to a golf course hole flag that could light a visible beacon attached to the flag when ranged by a handheld laser range finder to ensure that the hole flag itself was ranged and instead not a nearby object, which could result in a ranging error.

In some cases a handheld laser range finder has a field-of-view of 2 milliradian, which translates to about a 3.6-4.3 m illuminated spot at 1 km, which could illuminate multiple people and detectors. A relatively inexpensive laser pointer will have a wider illuminated spot at the same distance. Whether the safety device 104 triggers an illumination event alert depends on whether the overall light satisfies a high spatial power density/brightness when compared to associated ambient light.

Battery compartment cover 212 is used to secure a battery compartment for a user replaceable battery. In typical implementations the battery is rechargeable. In some implementations, the battery can be a CR123 size. Any appropriate battery consistent with this disclosure is also envisioned. If a non-rechargeable battery is used, in some implementations, the safety device 104 can detect the non-rechargeable battery configuration and prevent re-charging.

If the operational mode of the safety device 104 is set to auditory, speaker switch 214 speaker is activated to permit speaker volume level adjustment. For example, each press of the speaker switch 214 plays an incrementing increasingly louder tone to indicate speaker volume level. Once the highest speaker volume level is reached, the speaker volume tone can cycle to the lowest speaker volume level and begin cycling upwards again with each press of the speaker button 214. If the operational mode is set to haptic, the speaker button 214 can be disabled for use.

Mounting rod 216a and mounting rod 216b can be used to mount the safety device to an object (for example, a hunting vest, clothing, fence post, or vehicle) using the previously described or other mounting methods. For example, a VELCRO strap can be wound behind both mounting rod 216a and mounting rod 216b and around PAL webbing on a hunting or military tactical vest to secure the safety device 104 in a desired position/orientation.

FIG. 2B is a top perspective view 200b of the passive personal laser detector warning safety device 104, according to an implementation of the present disclosure. As previously described, power switch 202 is associated the power switch LED 218. Speaker switch 214 is also associated with a speaker switch LED 220. The speaker switch LED 220 can illuminate when the speaker switch 214 is active and depressed. In some implementations, the speaker switch LED 220 can illuminate at varying levels of intensity consistent with increasing levels of speaker volume intensity to provide a visual cue of speaker volume.

Figure 2C:
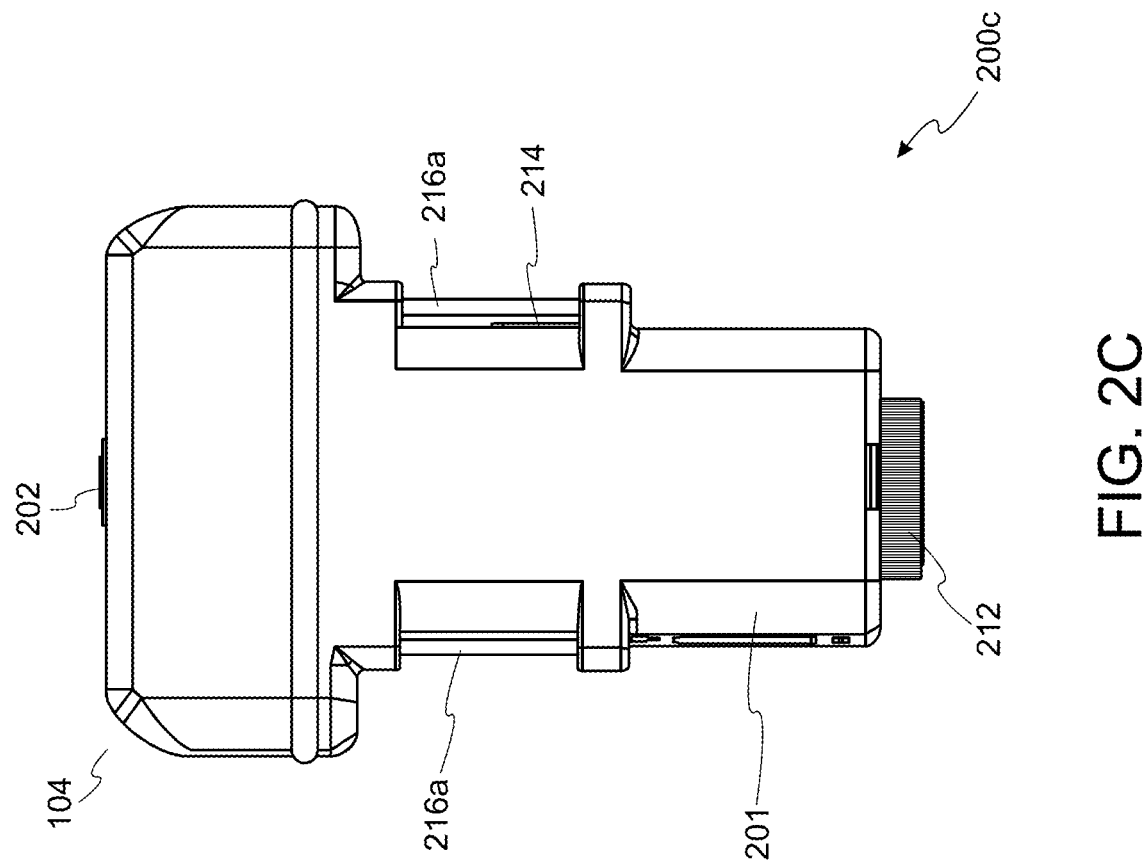
FIG. 2C is a rear view of the passive personal laser detector warning safety device, according to an implementation of the present disclosure.

FIG. 2C is a rear view 200c of the passive personal laser detector warning safety device 104, according to an implementation of the present disclosure. The rear view 200c illustrates the spacing between the right mounting rod 216a and left mounting rod 216b and the case 201 to permit use of the previously described of other mounting methods.

Figure 2D:
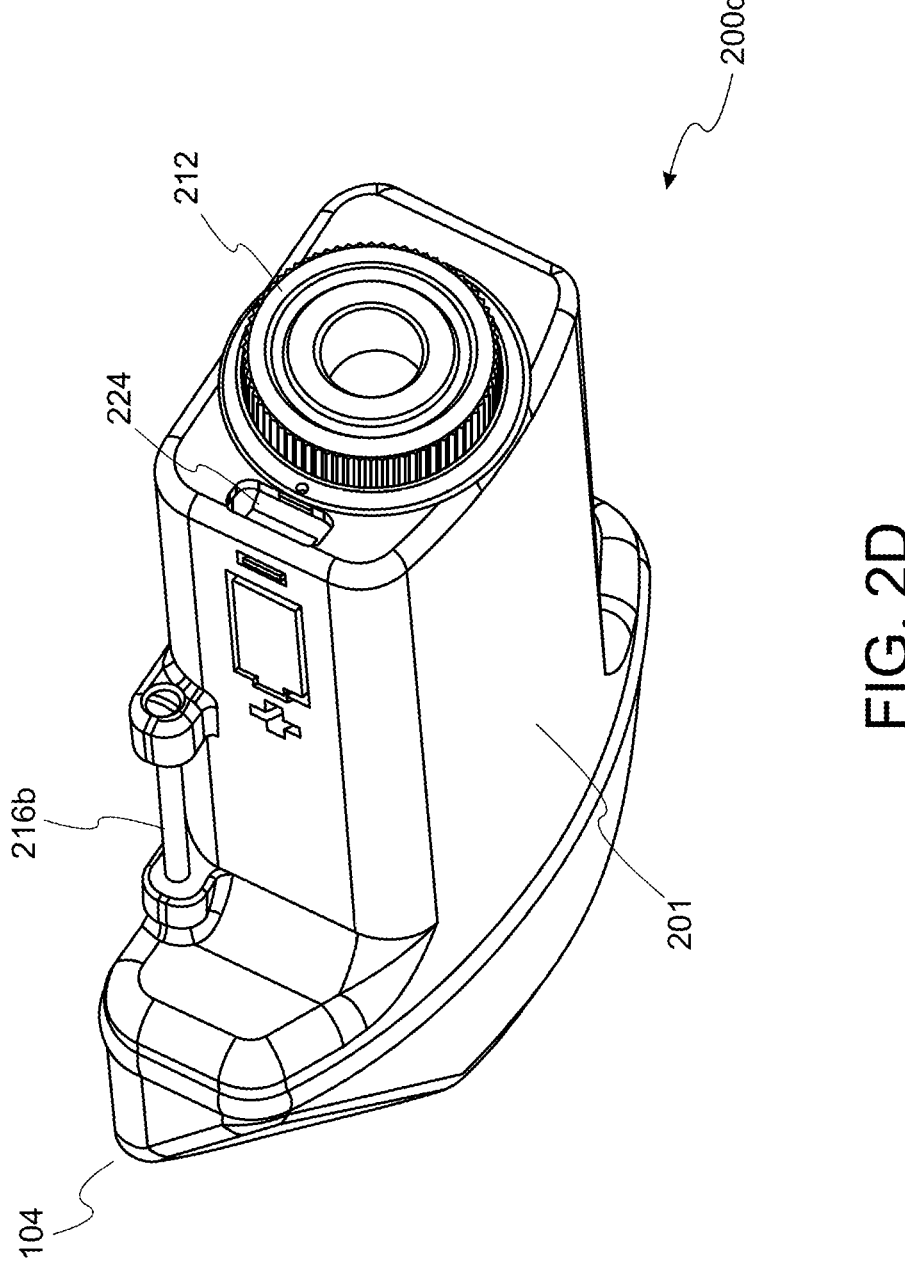
FIG. 2D is a bottom perspective view of the passive personal laser detector warning safety device, according to an implementation of the present disclosure.

FIG. 2D is a bottom perspective view 200d of the passive personal laser detector warning safety device 104, according to an implementation of the present disclosure. Illustrated is a connection port 224 (here, a USB-C-type port). The connection port 224 can be used to recharge a rechargeable battery, permit configuration/programming of features, firmware updates, transfer data, or to connect with other safety devices 104. In some implementations, the safety device 104 can also be configured with wireless connection capabilities (for example, Bluetooth, near-field communications (NFC), or Wi-Fi).

Figure 3B:
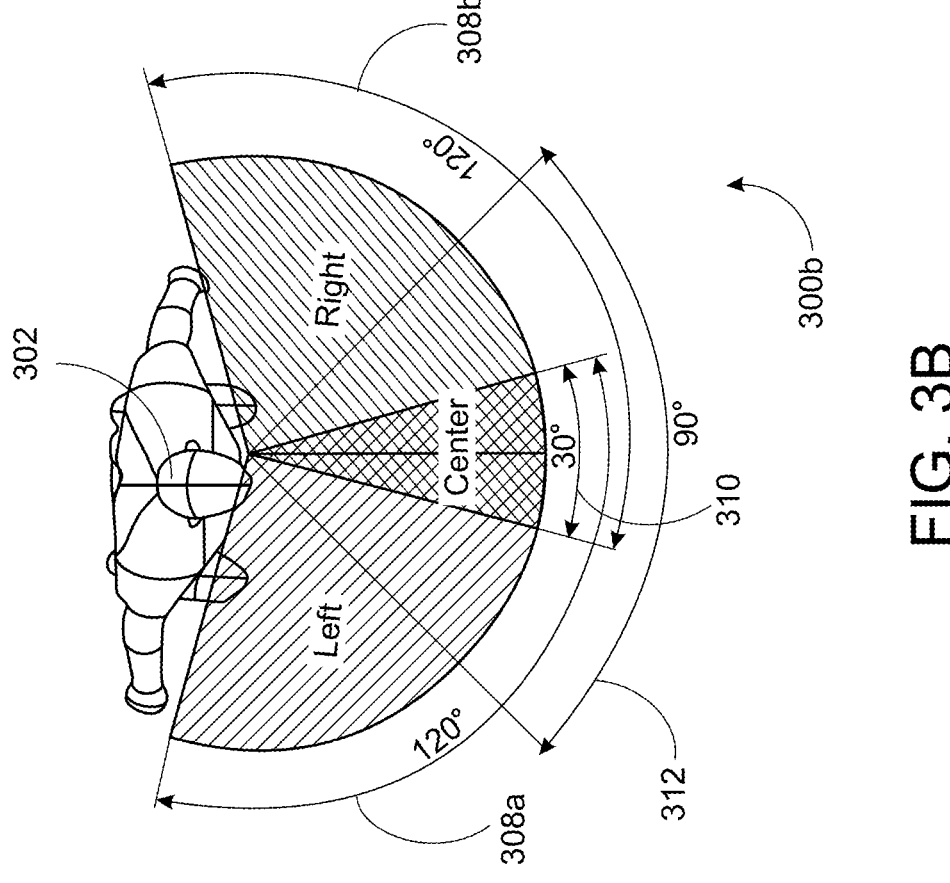
FIG. 3B is a top view of the horizontal field-of-view of the passive personal laser detector warning safety device, according to an implementation of the present disclosure.
Figure 3A:
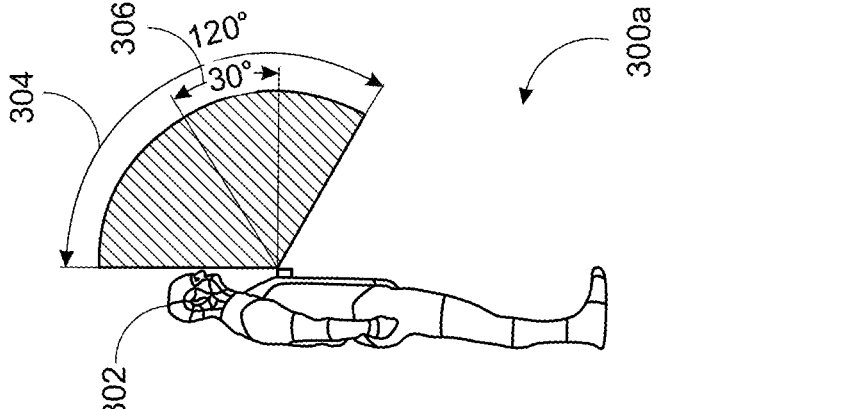
FIG. 3A is a side view of the vertical field-of-view of the passive personal laser detector warning safety device, according to an implementation of the present disclosure.

FIG. 3A is a side view 300a of the vertical field-of-view of the passive personal laser detector warning safety device 104, according to an implementation of the present disclosure. In typical implementations, the safety device 104 work by a user 302 (for example, hunter 102) has a vertical (elevation) detection capability of 120 degrees (304). The optimum detection results are usually obtained within a 30 degree elevation range (306) of normal relative to the detector.

FIG. 3B is a top view 300b of the horizontal field-of-view of the passive personal laser detector warning safety device 104, according to an implementation of the present disclosure.

In typical implementations, each detector has a 120 degree horizontal (azimuth) detection capability (308a and 308b, respectively), resulting in overlapping fields of detection. In some implementations, the horizontal overlap between two detectors is approximately 90 degrees. For example, each detector's optimum detection capability (approximately 100%) is 30 degrees of normal relative to the detector, so a combined center detection angle 310 of 30 degrees using both detectors would provide an optimal detection of a centrally located illumination event. Wider angles, for example 312 of a combined 90 degrees would have a relatively lower detection probability outside of the 30 degrees optimum range.

If both detectors (for example, detector 204a and 204b of FIG. 2A) pick up an illumination event, the safety device 104 can determine that the illumination event came from an angle that is defined by an overlap of the detectors.

Figure 4:
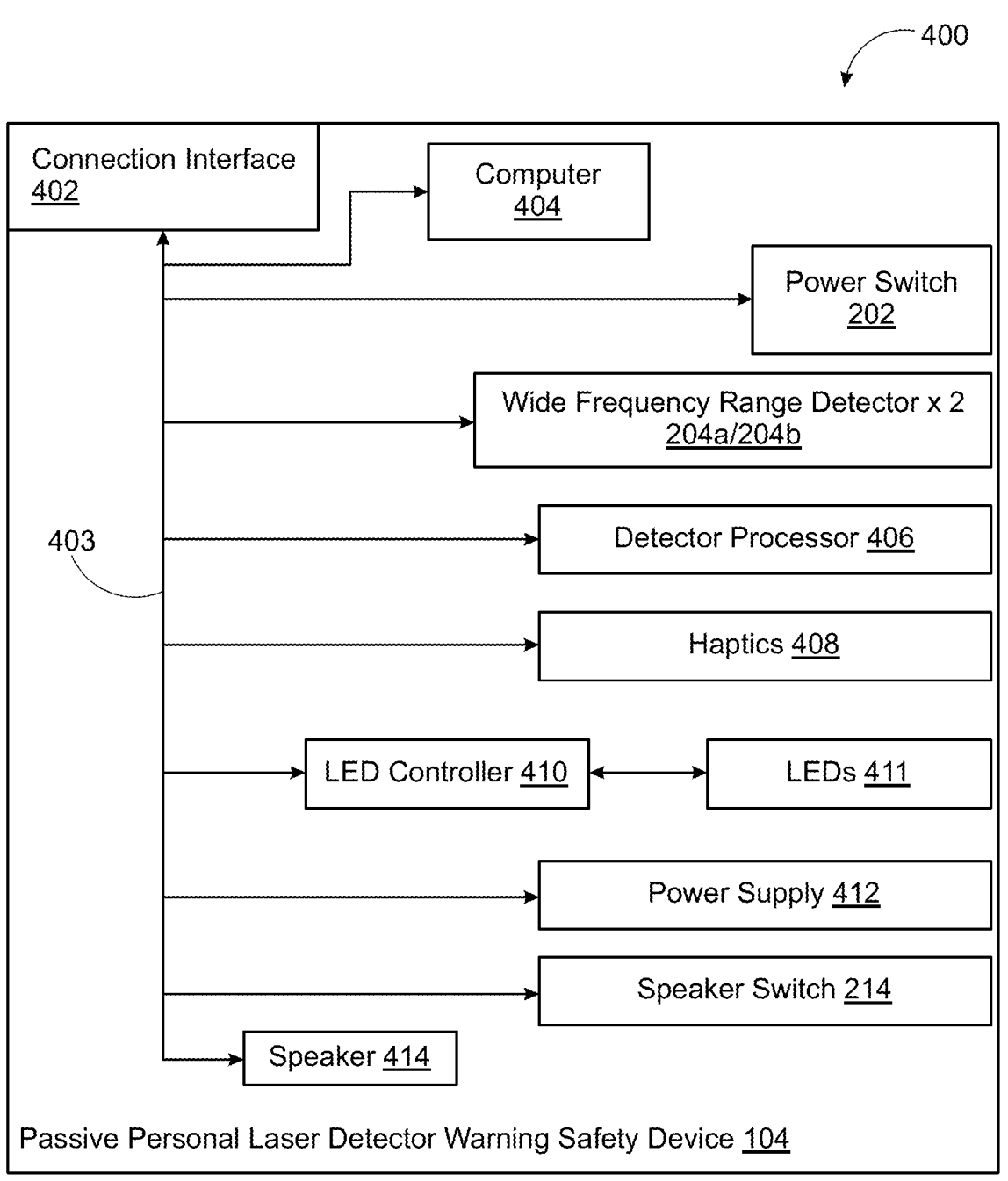
FIG. 4 is a block diagram of components of the passive personal laser detector warning safety device, according to an implementation of the present disclosure.

FIG. 4 is a block diagram 400 of components of the passive personal laser detector warning safety device, according to an implementation of the present disclosure. The illustrated components include a connection interface 402, bus 403, computer 404, detector processor 406, haptics 408, LED controller 410, LEDs 411, power supply 412, and speaker 414. Previously described components include the power switch 202, wide frequency detectors 204a and 204b, and speaker switch 414.

The connection interface 402 provides connection ability to the safety device 104 for, among other things, recharge a rechargeable battery, permit configuration/programming of features, firmware updates, transfer data, or to connect with other safety devices 104. The illustrated connection port 224 of FIG. 2D is interoperably coupled to the connection interface 402. The connection interface 402 can also provide wireless connection capabilities (for example, Bluetooth, NFC, or Wi-Fi).

The bus 403 provides data connectivity between all components of the safety device. While one possible configuration is illustrated in FIG. 4, other configuration of the bus 403 are also envisioned depending upon particular configurations of the safety device 104.

Computer 404 can provide some or all control functionality or computer processing functionality of the safety device 104. In some implementations, the computer 404 can work with one or more components of the safety device which also provide processing capability (for example, detector processor 406 or LED controller 410).

The detector processor 406 is used to process (for example, amplify and manage) signals received by the detectors (for example, 204a and 204b). The detector processor 406, among other things, determines if an illumination event has occurred (for example, light frequency, intensity, density, and/or duration is detected according to configured values), general directionality of the illumination event, and triggers appropriate illumination alerts to the user (for example, illuminating LEDs, sounding a tone, and activating haptics).

More specifically, the detector processor 406 continuously measures a background signal of ambient light. If another signal comes in that exceeds the background signal (for example, a high-intensity light source such as a laser) and is determined to be not spurious (for example, a flashlight or car headlight), then the other signal is considered to be additional illumination and measured. The resultant "measure" provides an estimation of what is "hitting" the detector(s) (for example, a high-intensity light source (such as, an IR illuminator), laser pointer, targeting laser, or laser range finder). In a case of a high-intensity light source or laser illumination, an illumination alert is generated to notify a user, as the additional illumination might be dangerous to the user.

Haptics 408 provide a sensory vibration if the safety device 104 is in a haptic operational mode.

LED controller 410 provides functionality to illuminate/ turn off or vary illuminated intensity of safety device LEDs 411 (for example, the right detector LED 206a and the left detector LED 206b) as previously described.

Power supply 412 is typically a rechargeable battery. As previously described, in some implementations, the battery can be a CR123 size. Any appropriate battery consistent with this disclosure is also envisioned. Power supply 412 can also include power supplied by a cable attached to the connection port 224 of FIG. 2D (for example, a USB-C cable).

Speaker 414 is used to provide auditory cues (for example, tones or spoken voice) to a user of the safety device 104.

Also illustrated are the power switch 202, wide frequency range detectors 204a/204b, and speaker switch 214, as previously described.

Other components consistent with this disclosure and described functionality, whether or not in the same illustrated configurations or arrangements, are considered to be within the scope of this disclosure.

Figure 5:
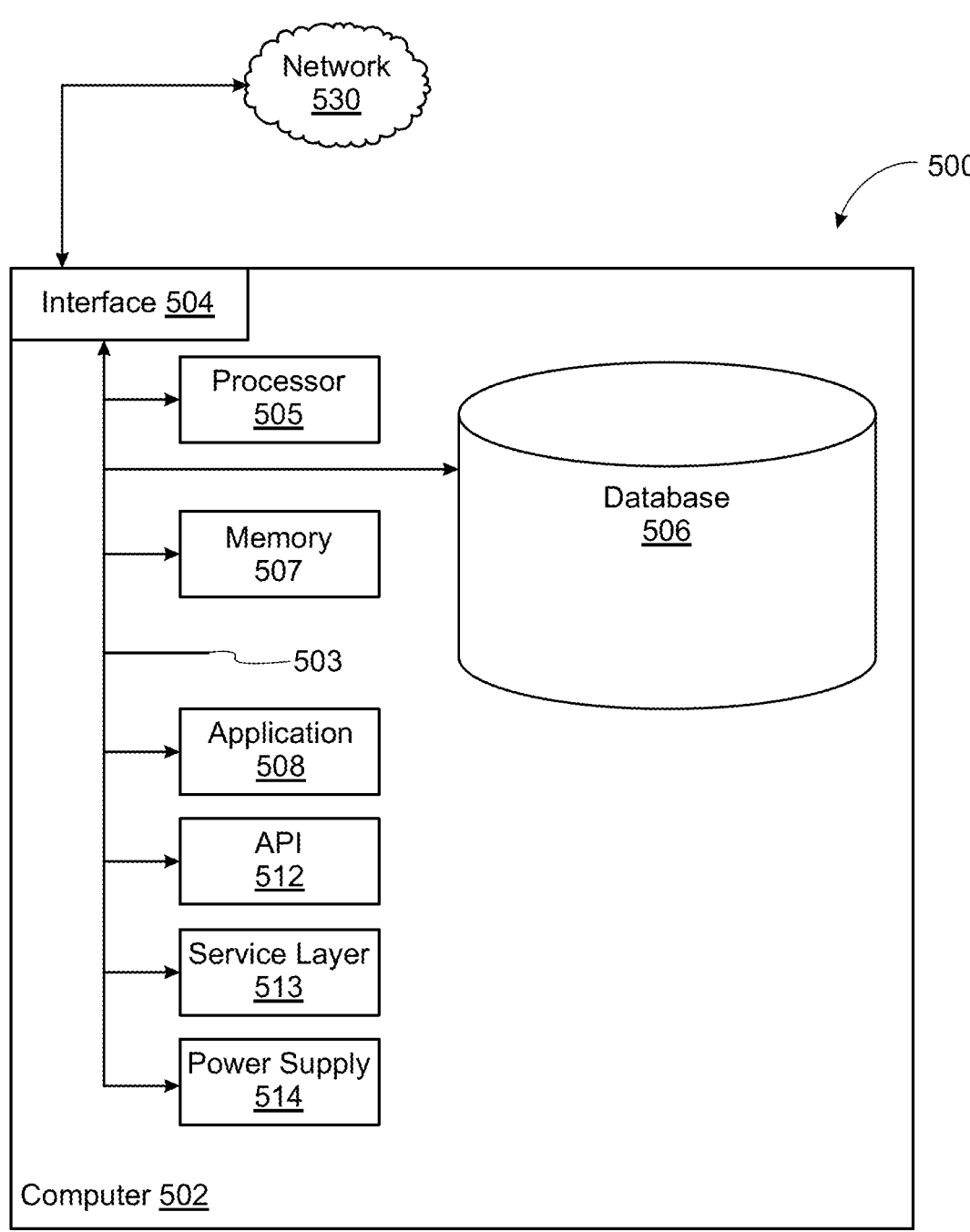
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 (for example, a computer 404 in FIG. 4) used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. The Database 506 can hold and operate on any data type consistent with the disclosure.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a passive personal laser detector warning safety device, comprising: a plurality of wide frequency range detectors which detect illumination by a high-intensity electromagnetic radiation source; a detector processor interoperably coupled to the plurality of wide frequency range detectors, wherein the detector processor continuously monitors a background signal of ambient electromagnetic radiation illumination, wherein the detector processor compares incoming signals that exceed the background signal, and wherein the detector processor generates an illumination alert with respect to determined non-spurious signals that exceed the background signal; a plurality of light emitting diodes which illuminate to indicate detection of and direction of the high-intensity electromagnetic radiation source; a speaker which emits tone or voice output; and haptics which provide haptic sensory feedback.

The foregoing and other described implementations can each, optionally, include one or more of the following features:

A first feature, combinable with any of the following features, wherein the plurality of wide frequency range detectors are arranged to provide a horizontal overlapping detection field-of-view.

A second feature, combinable with any of the previous or following features, wherein the horizontal overlapping detection field-of-view is approximately 90 degrees.

A third feature, combinable with any of the previous or following features, wherein the plurality of wide frequency range detectors provide a horizontal overlapping detection field-of-view.

A fourth feature, combinable with any of the previous or following features, wherein the detector processor determines that illumination by the high-intensity electromagnetic radiation source has occurred, and determines a general directionality of the high-intensity electromagnetic radiation source.

A fifth feature, combinable with any of the previous or following features, wherein a plurality of passive personal laser detector warning safety devices can be communicatively coupled to provide alerts to all passive personal laser detector warning safety devices.

A sixth feature, combinable with any of the previous or following features, wherein the communicative coupling is encrypted.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A passive personal laser detector warning safety device, comprising:

a plurality of wide frequency range detectors which detect illumination by a high-intensity electromagnetic radiation source;

a detector processor interoperably coupled to the plurality of wide frequency range detectors, wherein the detector processor amplifies signals received by the plurality of wide frequency range detectors, wherein the detector processor continuously monitors a background signal of ambient electromagnetic radiation illumination, wherein the detector processor compares if incoming signals exceed the background signal, wherein the detector processor determines whether the incoming signals that exceed the background signal are spurious, wherein, after the determination whether the incoming signals that exceed the background signal are spurious, the detector processor measures incoming signals that are determined to be non-spurious and the measurement provides an estimation of a source type for the incoming signals, and wherein the detector processor generates an illumination alert with respect to determined non-spurious signals that exceed the background signal;

a plurality of light emitting diodes which illuminate to indicate detection of and direction of the high-intensity electromagnetic radiation source;

a speaker which emits tone or voice output; and haptics which provide haptic sensory feedback.

2. The passive personal laser detector warning safety device of claim 1, wherein the plurality of wide frequency range detectors are arranged to provide a horizontal overlapping detection field-of-view.

3. The passive personal laser detector warning safety device of claim 2, wherein the horizontal overlapping detection field-of-view is approximately 90 degrees.

4. The passive personal laser detector warning safety device of claim 1, wherein the plurality of wide frequency range detectors provide a horizontal overlapping detection field-of-view.

5. The passive personal laser detector warning safety device of claim 1, wherein the detector processor determines that illumination by the high-intensity electromagnetic radiation source has occurred, and determines a general directionality of the high-intensity electromagnetic radiation source.

6. The passive personal laser detector warning safety device of claim 1, wherein the passive personal laser detector warning safety device can be communicatively coupled to provide alerts to a plurality of passive personal laser detector warning safety devices.

7. The passive personal laser detector warning safety device of claim 6, wherein the communicative coupling is encrypted.

* * * * *